United States Patent [19]

Benjamin et al.

[11] 3,896,056

[45] July 22, 1975

[54] BUILT DETERGENT COMPOSITION

[75] Inventors: Lawrence Benjamin; Daniel S. Connor, both of Cincinnati, Ohio

[73] Assignee: The Procter & Gamble Company, Cincinnati, Ohio

[22] Filed: Mar. 2, 1973

[21] Appl. No.: 337,333

Related U.S. Application Data

[63] Continuation-in-part of Ser. No. 100,546, Dec. 21, 1970, abandoned, which is a continuation-in-part of Ser. No. 98,158, Dec. 14, 1970, abandoned.

[52] U.S. Cl. .................. 252/539; 252/89; 252/526; 252/527; 252/529; 252/535; 252/536; 252/538; 252/545; 252/546; 252/548; 252/554; 252/555; 252/557; 252/175

[51] Int. Cl.$^2$......................................... C11B 3/065

[58] Field of Search ............. 252/89, 175, 180, 181, 252/526, 527, 529, 535, 536, 538, 539, 545, 546, 548, 554, 555, 557; 210/58

[56] References Cited

UNITED STATES PATENTS

| | | | |
|---|---|---|---|
| 2,264,103 | 11/1941 | Tucker.................................. | 210/23 |
| 2,311,008 | 2/1943 | Tucker.................................. | 210/23 |
| 2,327,302 | 8/1943 | Dittmar........................... | 252/181 X |
| 3,308,067 | 3/1967 | Diehl .................................. | 252/161 |
| 3,520,813 | 7/1970 | Hansen et al. ................... | 252/181 X |
| 3,629,121 | 12/1971 | Elib....................................... | 252/89 |

FOREIGN PATENTS OR APPLICATIONS 870,557   5/1971   Canada................................ 134/22

OTHER PUBLICATIONS

Journal of the American Oil Chemists' Society, Vol. 47, pp. 522–524 (Dec. 1970).
Surface Active Agents, Vol. I, pp. 234–235, Interscience Pub., New York, 1949, Schwartz et al.

*Primary Examiner*—Leland A. Sebastian
*Attorney, Agent, or Firm*—Richard C. Witte; Julius P. Filcik; Forrest L. Collins

[57] ABSTRACT

This invention relates to a built detergent composition consisting essentially of an organic surface-active agent selected from the group consisting of anionic; nonionic; zwitterionic; and ampholytic detergents; and mixtures thereof; an inorganic precipitating builder selected from a water-soluble aluminate, silicate, carbonate and mixtures thereof, and a precipitation modifier characterized by 1. its ability to prevent the formation of a precipitate visible to the unaided eye for 5 minutes; and
2. its ability to prevent the visible precipitate formed from settling out of solution for 20 minutes when the precipitation modifier is present at a final concentration of 0.01% by weight under the following conditions:
   a. a solution pH of 10, a solution temperature of 125°F. and the solution having the following composition at the start of the test;
   14 grains per gallon of hardness ions at a 3:1 molar ratio calcium to magnesium, 0.05% by weight precipitating builder, 1:1 weight ratio sodium carbonate to silicate, the sodium silicate having a $SiO_2:Na_2O$ ratio of 2.0, and 0.025% by weight surfactant, 1:1 ratio of sodium dodecylbenzene sulfonate to sodium tallow triethoxysulfate;

whereby the weight ratio of said builder to said modifier is in the range from 1000:1 to 1:1, and the weight ratio of said organic surface-active agent to said builder is in the range from 20:1 to 1:20.

In a preferred embodiment, the essential organic surface-active agents have a solubility in water of at least 0.05% at about 80°F. to about 200°F.; they have efficient soil-removing and soil-dispersing properties in water in an amount of about 0.05%; and they are resistant to precipitation by hard water mineral ions.

8 Claims, No Drawings

BUILT DETERGENT COMPOSITION

CROSS-REFERENCE

This application is a continuation-in-part application of application Ser. No. 100,546, filed Dec. 21, 1970, now abandoned titled BUILDER COMPOSITIONS CONTAINING PRECIPITATING BUILDERS AND A PRECIPITATION MODIFIER AND DETERGENT COMPOSITIONS CONTAINING THEM with inventors Lawrence Benjamin and Daniel S. Connor, which is a continuation-in-part application of application Ser. No. 98,158, filed Dec. 14, 1970, now abandoned, titled BUILDER COMPOSITIONS CONTAINING PRECIPITATING BUILDERS AND A PRECIPITATION MODIFIER AND DETERGENT COMPOSITIONS CONTAINING THEM with inventors Lawrence Benjamin and Daniel S. Conner.

BACKGROUND OF THE INVENTION

It has been known that when builders are added to active synthetic detergent component or components of washing compositions, an increase in cleaning ability or whiteness maintenance or both is obtained, even though the washing solution used may contain less of the active detergent. Cleaning ability is the ability of a solution of the detergent composition to remove soil from cloth. Whiteness maintenance relates to the ability of a detergent solution to prevent suspended soil from depositing on the cloth during the washing operation. The term "detergency" as used herein is intended to embrace both cleaning ability and whiteness maintenance.

Building effects have been noted in connection with various inorganic salts, such as alkali metal carbonates, bicarbonates, borates, phosphates and silicates. Inorganic builders such as water-soluble polyphosphates, and in particular, water-soluble pyrophosphates and tripolyphosphates are widely used. Of these, sodium tripolyphosphate is the builder most generally used in solid detergent compositions. In the formulation of liquid detergent compositions, water-soluble pyrophosphates are generally preferred because of the tendency of tripolyphosphates to hydrolyze in aqueous solution during long periods of storage, forming some pyrophosphate and some orthophosphate; the latter is a less efficient builder and has among other disadvantages a detrimental effect on the softness of the fabrics being treated. In liquid formulations, also, the potassium slats of inorganic builders are sometimes used to take advantage of their greater solubility.

The nature of the building action is not fully understood. There appears to be a connection between the ability of a builder to soften the water which is used to make up the washing solution, and the improved results in detergency obtained when the builder is used. But not all materials which act to sequester hardness-imparting calcium and magnesium ions perform satisfactorily as builders. Further, useful building action with the most effective builders can be noted both above and below the point at which the builder is present in the washing solution in stoichiometric proportions to the hardness in water.

Many detergent products employ compounds such as sodium tripolyphosphate which complex the calcium and magnesium ions in solution and thereby preventing them from interfering with the cleaning action of the surfactant. Another way to accomplish almost the same thing is to precipitate the calcium and magnesium using various water-soluble inorganic compounds which contain anions that form relatively insoluble precipitates with calcium and to a lesser degree with magnesium. Examples of anions which form precipitates with calcium and magnesium are the carbonate, silicate, and aluminate ions. One of the main problems with precipitating builders such as those described above is the depositing of the precipitate formed upon the fabrics being washed. This is especially troublesome when colored fabrics are being washed. Conventional soil suspension agents such as sodium carboxymethylcellulose are unable to prevent the deposition of the precipitates formed by the above builders upon colored fabrics, especially after repeated washings. Phosphate builders, which form a complex with the hardness ions prevent this problem; however, it has now become desirable to remove phosphates or, at least, to drastically reduce their level in detergent products. The reason for this is that apparently phosphates contribute to an "accelerated" eutrophication.

Eutrophication is a natural process which is vital to sustaining the life of any lake or stream by enabling plant organisms to grow in the water and thus provide food for fish.

Too much plant life in lakes and streams consumes the oxygen needed by fish and thus destroys the proper ecological balance in these bodies of water. This excessive eutrophication is caused by too many nutrients going into lakes and streams. The phosphates, which are found in the most generally used solid detergent compositions, are one such nutrient. However, phosphates by themselves do not cause excessive eutrophication. Other nutrients, such as carbon and nitrogen must also be present. It is the combination of nutrients which stimulates the growth of plant life in lakes and streams.

However, the removal of polyphosphates or their reduction below a certain minimum level in detergent products results in an essential change inasmuch as polyphosphates no longer serve their traditional builder function. As an example, a minimum 10% level of polyphosphates is experienced as getting marginal to unsatisfactory, even in water of relatively low hardness, with respect to builder activity in conjunction with surface-active agents.

It is a basic object of this invention to provide biodegradable detergent compositions that are free of phosphorus, or wherein the polyphosphate builder levels have been reduced drastically as the presence of major amounts of that component in lakes and streams may contribute to excessive or accelerated eutrophication.

It is a main object of this invention to provide a built detergent composition which contains a precipitating builder yet modifies the precipitation to prevent the deposition of the precipitate upon the fabrics being washed.

It is also an object of this invention to provide a built detergent composition capable of providing effective builder action, including the control of essentially all of the calcium and magnesium ions in the washing solution.

It is a further object of this invention to provide built detergent compositions that contain biodegradable, non-phosphorus builders in combination with certain precipitation modifiers whereby the latter unexpectedly serve to make up for the absence of polyphosphates in amounts representative of detergent building activity and, therefor, contribute to the attainment of good cleaning performance under household laundry conditions.

SUMMARY OF THE INVENTION

This invention accomplishes the above objectives by providing built detergent compositions consisting essentially of:
a. from 5 to 95% by weight of an organic surface-active agent selected from the group consisting of anionic; nonionic; zwitterionic; and ampholytic detergents; and mixtures thereof;
b. from 95 to 5% by weight of a mixture of:
  i. an inorganic precipitating builder selected from the group consisting of a water-soluble carbonate, silicate and aluminate salt and mixtures thereof; and
  ii. a precipitation modifier which
    i. will prevent the formation of a precipitate visible to the unaided eye for 5 minutes; and
    ii. will prevent settling out of solution for 20 minutes when the precipitation modifier is present at a final concentration of 0.01% by weight under the following conditions:
      a. a solution pH of 10, a solution temperature of 125°F. and the solution having the following composition at the start of the test;
      14 grains per gallon of hardness ions at a 3:1 molar ration calcium to magnesium, 0.05% by weight precipitating builder, 1:1 weight ratio sodium carbonate to silicate, the sodium silicate having a $SiO_2:Na_2O$ ratio of 2.0 and 0.025% by weight surfactant, 1:1 ratio of sodium dodecylbenzene sulfonate to sodium tallow triethoxysulfate;
whereby the weight ratio of said builder to said modifier is in the range from 1000:1 to 1:1 and the weight ratio of said organic surface-active agent to said builder is in the range from 20:1 to 1:20.

DETAILED DESCRIPTION OF THE INVENTION

The objects of the invention are accomplished by a built detergent composition which contains as essential ingredients (1) an organic surface-active agent; (2) a precipitating builder; and (3) a precipitation modifier.

Unless stated to the contrary, the "%" indications herein stand for "% by weight".

The precipitating builders which are well known in the art are carbonates, silicates and aluminates. The water soluble salts of said inorganic builders include the alkali metal salts such as potassium, lithium and sodium. The preferred salts are the potassium and sodium salts such as sodium carbonate, aluminate and silicate, and potassium carbonate, aluminate and silicate. The precipitating builders and the precipitation modifiers are used in an amount from 5 to 95%. The precipitating builders preferably represent from about 70 to about 25% of the detergent compositions of this invention.

The precipitation modifier is characterized by
1. its ability to prevent the formation of a precipitate visible to the unaided eye for 5 minutes; and
2. its ability to prevent the visible precipitate formed from settling out of solution for 20 minutes when the precipitation modifier is present at a final concentration of 0.01% by weight under the following conditions:
   a. a solution pH of 10, a solution temperature of 125°F. and the solution having the following composition at the start of the test;
   14 grains per gallon of hardness ions at a 3:1 molar ratio calcium to magnesium, 0.05% by weight precipitating builder, 1:1 weight ratio sodium carbonate to silicate, the sodium silicate having a $SiO_2:Na_2O$ ratio of 2.0 and 0.025% by weight surfactant, 1:1 ratio of sodium dodecylbenzene sulfonate to sodium tallow triethoxysulfate.

The above description of the functional test for a precipitation modifier is required due to the completely unpredictable nature of the compounds which satisfy the test. At first it was thought that anything which is able to sequester calcium in solution should work, but this is not the case. If this property to modify the precipitation of the hardness ions were related to the sequestering ability of any given compound, then the relative performance shown in the example of xylaric acid being superior to cyclopentane-cis,cis,cis-tetracarboxylic acid which, in turn, is superior to mellitic acid would be just the reverse, for their ranking as sequestrants puts mellitic acid first, cyclopentane-cis,cis,cis-tetracarboxylic acid next with xylaric acid last.

It should also be noted that both polymaleic acid and polyacrylic acid of the molecular weights of Example I have some sequestering ability, which only polyacrylic works as a precipitation modifier.

The test of Example I was used to determine the ability of the compounds listed to modify hardness precipitation during the use of the built detergent compositions of this invention.

EXAMPLE I

The precipitation modifiers for use in the compositions of this invention were selected using the following precedure:
1. an ingredient to be tested as precipitation modifier for use in the instant compositions was added to an aqueous solution in an amount corresponding to a final concentration of 0.01% by weight;
2. the solution pH was adjusted to a pH value of 10 by the addition of sodium hydroxide;
3. simultaneously, an amount of the following were added from stock solutions at 125°F. to give the desired final concentration; hardness ions (3:1 molar ratio calcium: magnesium), precipitation builder (1:1 weight ratio sodium carbonate: sodium silicate, wherein the $SiO_2:Na_2O$ ratio is 2.0), and surfactant (1:1 sodium dodecylbenzene sulfonate: sodium tallow triethoxy sulfate). The final concentrations were: hardness—14 grains/gallon, builder mixture—0.05%, and surfactant 0.025%
4. said solution was stirred for one minute, and then observed for a period of time to record precipitate growth.

Superior precipitation modifiers produce no turbidity for a period of time over 30 minutes, while the excellent group maintains no turbidity for a period of 30 minutes, while those that form a turbid solution at 15 minutes are considered good, and those which form a turbid solution within 5 minutes are considered fair, and those that form a turbid solution in less than 5 minutes are poor. The turbidity of the solution is determined as follows: A completely clear solution after 30 minutes is excellent, an optimum solution forms a very pale blue colloidal dispersion within 30 minutes, yet does not become cloudy. Other solutions become cloudy or have a milky appearance by the time limit indicated while the poor solutions form settled precipitates shortly after the addition of the carbonate/silicate builder. Table I lists representative compounds used as precipitation modifiers in the compositions of this invention and their performance in the above-described tests.

TABLE I

| Precipitation Modifier | Onset of Slight Turbidity | Onset of Noticeable Precipitate |
|---|---|---|
| Mellitic acid | 15 | 30 |
| Cyclopentane-cis,cis,cis-tetra-carboxylic acid | clear | clear for duration of test period (30 min.) |
| xylaric acid | " | " |
| adipic acid | 1 | 2 |
| citric acid | 1 | 2 |
| tartaric acid | 1 | 2 |
| polyacrylic acid (average molecular wt. of Ca 3500) | 25 | 30 |
| sulfoacetic acid | <1 | 2 |
| sodium bisulfite | 2 | 30 |
| hexasodium 1,-1,3,3,5,5-pentane hexa-carboxylate | 5 | >30 |
| gluconic acid | 1 | 5 |
| trisodium pholoroglucinol trisulfonate | 5 | 10 |
| isocitric acid | 1 | 2 |
| oxydiacetic acid | 2 | 5 |
| ethylenedioxy-diacetic acid | 1 | 2 |
| humic acid | <1 | 1 |
| sodium formaldehyde sulfoxylate | 1 | 5 |
| tetrasodium 1,1-3,3-propane tetracarboxylate | 1 | 2 |
| terephthalic acid | <1 | <1 |
| disodium 4,5-dihydroxy meta benzene disulfonate (Tiron) | 1 | 2 |
| oxydisuccinate | 1 | 2 |
| sodium polymaleic acid average molecular weight 4,200 | <1 | <1 |
| addition product of polyvinylethyl-ether (MW 4000) & 20% maleic acid | clear | clear for duration of test period (30 min.) |
| addition product of polyethyleneglycol (MW 1000) diacetate & 10% maleic acid | " | " |
| addition product of polyethyleneglycol (MW 600) diacetate & 40% maleic acid | " | " |
| addition product of pentaerythritol ethylene oxide (MW 4000) tetraacetate & 40% maleic acid | " | " |
| addition product polyethylene oxide (20 molecules) sperm oil alcohol acetate & 32.5% maleic acid | " | " |
| ethylenetetra-carboxylic acid | " | " |
| polyallylsuccinate | " | " |
| hexapotassium cyclopentadienide pentacarboxylate | " | " |
| isobutylenemaleic acid copolymer | " | " |
| sodium polymaleic acid sulfonate | 2 | >30 |
| 2,3,4,5-tetra-hydrofuran-cis,cis,cis-tetra-carboxylic acid | 30 | >30 |
| maleic acid/acrylic acid co-polymer | 2 | >30 |
| tricarboxy starch trisodium salt | 2 | >30 |
| carboxymethyl starch D.S.*0.8 | 10 | >30 |
| carboxymethyl starch D.S.*1.7 | clear | clear for duration of test period (30 min.) |
| polycarboxymethyl-ated dicarboxyl starch D.S.* approx. 2.8 | " | " |
| sodium salt of carboxymethyl cellulose D.S.* 2.0 | 30 | >30 |
| carboxymethyl dextran D.S.*2.0 | 30 | >30 |
| propylene/maleic acid polymer | clear | clear for duration of test period (30 min.) |
| diacid cellulose | 30 | >30 |
| carboxymethylated sodium alginate | 30 | >30 |
| vinylmethylether/maleic acid co-polymer low molecular weight | clear | clear for duration of test period (30 min.) |
| vinylmethylether/maleic acid co-polymer medium molecular wt. | " | " |
| vinylmethylether/maleic acid co-polymer high molecular wt. | " | " |
| sodium perborate | " | " |
| sodium polymaleic acid (MW 2500) | 5 | 10 |
| sodium alginate | 10 | 30 |
| 70:30 acrylic acid/hydroxyethyl-maleate copolymer | clear | clear for duration of test period (30 min.) |
| polymethyacrylic acid | " | " |
| 1:1 styrene/maleic acid copolymer | 15 | 30 |
| polyvinylsulfate | clear | clear for duration of test period (30 min.) |
| naphthenic acids, sodium salts | 1 | 15 |
| alkali metal salt of $C_{12}$ to $C_{18}$ fatty soaps (tallow/coconut 90:10; sodium/potassium 80:20) | 1 | 2 |

*D.S. means Degree of Substitution

The proportion by weight of the precipitating builder to the precipitation modifier is in the range from 1000:1 to 1:1. A preferred range of proportions is from 500:1 to 2:1.

Examples of preferred modifiers for use in the instant compositions are: mellitic acid, xylaric acid, -cyclopentane-cis,cis,cis-tetracarboxylic acid, polyacrylic acid (average molecular wt. of Ca 3500), addition product of polyvinylethylether (MW 4000) & 20% maleic acid, addition product of polyethyleneglycol (MW 1000) diacetate & 10% maleic acid, addition product of polyethyleneglycol (MW 600) diacetate & 40% maleic acid, addition product of pentaerythritol ethylene oxide (MW 4000) tetraacetate & 40% maleic acid, addition product of polyethylene oxide (20 molecules) sperm oil alcohol acetate & 32.5% maleic acid, ethylenetetracarboxylic acid, polyallylsuccinate, hexapotassium cyclopentadienide pentacarboxylate, isobutylene-maleic acid copolymer, 2,3,4,5-tetrahydrofuran-cis,cis,cis-tetracarboxylic acid, carboxymethyl starch degree of substitution 0.8, carboxymethyl starch degree of substitution 1.7, polycarboxymethylated dicarboxyl starch degree of substitution approx. 2.8, sodium salt of carboxymethyl cellulose degree of substitution 2.0, carboxymethyl dextran degree of substitution 2.0, propylene/maleic acid copolymer, diacid cellulose, carboxymethylated sodium alginate vinylmethylether/maleic acid copolymer low molecular weight, vinylmethylether/maleic acid copolymer medium molecular weight, vinylmethylether/maleic acid copolymer high molecular weight, sodium perborate, sodium alginate, 70:30 acrylic acid/hydroxyethylmaleate copolymer, polymethylacrylic acid, 1:1 styrene/maleic acid copolymer, and polyvinyl sulfate. It shall be noted, however, that the modifiers listed represent an arbitrary choice inasmuch as various other modifiers can qualify for use as preferred modifiers in the compositions of this invention. However, the very unpredictable modifier characteristics require effective checking of each candidate modifier which entails that a limitative enumeration of the preferred modifiers is almost to be excluded because of practical consideration. The precipitation modifiers shall be used in well-defined weight ratios as referred to hereinbefore. However, in most cases, and particularly in the event organic modifiers are used, an amount in the range from 0.1% to about 10% delivers optimum precipitation modifying properties.

An especially preferred class of modifiers for use in the compositions of this invention are glassy phosphates of the general formula

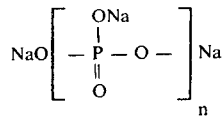

whereby $n$ is an interger of at least 3. Well known species of the like glassy phosphates includes HEXAPHOS, SODAPHOS, and GLASS H (FMC brands of the glassy phosphates) wherein n is approximately 13, 6 and 21 respectively. These ingredients, when present in unadjusted form, are available as powder, fine granules, plates, and coarse granules, HEXAPHOS is available in adjusted form, i.e. as powder and granules.

Said glassy phosphates as well as other inorganic modifiers deploy optimum precipitation modifying characteristics when used in an amount from about 0.1 to about 5%.

The organic surface-active agents which find applicability in the compositions of the present invention include anionic; nonionic; zwitterionic; and ampholytic detergents and mixtures thereof. The preferred organic surface-active agents are hardness, especially calcium, insensitive detergents; they have a solubility in water of at least 0.05% at about 80° to about 200°F.; they have efficient soil-removing and soil-dispersing properties in water in an amount of about 0.05%; and they are resistant to precipitates by hard water mineral ions.

Examples of the individual classes of organic surface-active agents follow hereinafter:

A. Anionic Soap and Non-Soap Synthetic Detergents

This class of detergents includes ordinary alkali metal soaps such as the sodium, potassium, ammonium and alkylolammonium salts of higher fatty acids containing from about 8 to about 24 carbon atoms and preferably from about 10 to about 20 carbon atoms. Suitable fatty acids can be obtained from natural sources such as, for instance, from plant or animal esters (e.g., palm oil, coconut oil, babassu oil, soybean oil, castor oil, tallow, whale and fish oils, grease, lard, and mixtures thereof). The fatty acids also can be synthetically prepared (e.g., by the oxidation of petroleum, or by hydrogenation of carbon monoxide by the Fischer-Tropsch process). Resin acids are suitable such as rosin and those resin acids in tall oil. Napthenic acids are also suitable. Sodium and potassium soaps can be made by direct saponification of the fats and oils or by the neutralization of the free fatty acids which are prepared in a separate manufacturing process. Particularly useful are the sodium and potassium salts of the mixtures of fatty acids derived from coconut oil and tallow, i.e., sodium or potassium tallow and coconut soap.

This class of detergents also includes water-soluble salts, particularly the alkali metal salts of organic sulfuric reaction products having in their molecular structure an alkyl radical containing from about 8 to about 22 carbon atoms and a sulfonic acid or sulfuric acid ester radical. (Included in the term alkyl is the alkyl portion of higher acyl radicals.) Examples of this group of synthetic detergents which form a part of the preferrred built detergent compositions of the present invention are the sodium or potassium alkyl sulfates, especially those obtained by sulfating the higher alcohols ($C_8$–$C_{18}$ carbon atoms) produced by reducing the glycerides of tallow or coconut oil; sodium or potassium alkyl benzene sulfonates, in which the alkyl group contains from about 9 to about 15 carbon atoms, in straight chain or branched chain configuration, e.g., those of the type described in U.S. Pat. Nos. 2,220,099 and 2,477,383 (especially valuable are linear straight chain alkyl benzene sulfonates in which the average of the alkyl groups is about 13 carbon atoms abbreviated hereinafter as $C_{13}LAS$); sodium alkyl glyceryl ester sulfonates, especially those ethers of higher alcohols derived from tallow and coconut oil; sodium coconut oil fatty acid monoglyceride sulfonates and sulfates; sodium or potassium salts of alkyl phenol ethylene oxide ether sulfate with about 1 to about 10 units of ethylene oxide per molecule and in which the alkyl radicals contain about 8 to about 12 carbon atoms.

B. Nonionic Synthetic Detergents

Nonionic synthetic detergents may be broadly defined as compounds produced by the condensation of alkylene oxide groups (hydrophilic in nature) with an organic hydrophobic compound, which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements.

For example, a well known class of nonionic synthetic detergents is made available on the market under the trade name of "Pluronic." These compounds are formed by condensing ethylene oxide with a hydrophobic base formed by the condensation of propylene oxide with propylene glycol. The hydrophobic portion of the molecule which, of course, exhibits water insolubility, has a molecular weight of from about 1500 to 1800. The addition of polyoxyethylene radicals to this hydrophobic portion tends to increase the water solubility of the molecule as a whole and the liquid character of the product is retained up to the point where polyoxyethylene content is about 50% of the total weight of the condensation product.

Other suitable nonionic synthetic detergents include:

1. The polyethylene oxide condensates of alkyl phenols, e.g., the condensation products of alkyl phenols having an alkyl group containing from about 6 to 12 carbon atoms in either a straight chain or branched chain configuration, with ethylene oxide, the said ethylene oxide being present in amounts equal to 5 to 25 moles of ethylene oxide per mole of alkyl phenol. The alkyl substituent in such compounds may be derived from polymerized propylene, diisobutylene, octene, or nonene, for example.

2. Those derived from the condensation of ethylene oxide with the product resulting from the reaction of propylene oxide and ethylene diamine. For example, compounds containing from about 40% to about 80% polyoxyethylene by weight and having a molecular weight of from about 5,000 to about 11,000 resulting from the reaction of ethylene oxide groups with a hydrophobic base constituted of the reaction product of ethylene diamine and excess propylene oxide, said base having a molecular weight of the order of 2,500 and 3,000, are satisfactory.

3. The condensation product of aliphatic alcohols having from 8 to 22 carbon atoms, in either straight chain or branched chain configuration, with ethylene oxide, e.g., a coconut alcohol-ethylene oxide condensate having from 5 to 30 moles of ethylene oxide per mole of coconut alcohol, the coconut alcohol fraction having from 10 to 14 carbon atoms.

4. Nonionic detergents include nonyl phenol condensed with either about 10 to about 30 moles of ethylene oxide per mole of phenol and the condensation products of coconut alcohol with an average of either about 5.5 or about 15 moles of ethylene oxide per mole of alcohol and the condensation product of about 15 moles of ethylene oxide with one mole of tridecanol. Other examples include dodecylphenol condensed with 12 moles of ethylene oxide per mole of phenol; dinonylphenol condensed with 15 moles of ethylene oxide per mole of phenol; dodecyl mercaptan condensed with 10 moles of ethylene oxide per mole of mercaptan; bis-(N-2-hydroxyethyl) lauramid; nonyl phenol condensed with 20 moles of ethylene oxide per mole of nonyl phenol; myristyl alcohol condensed with 10 moles of ethylene oxide per mole of myristyl alcohol; lauramide condensed with 15 moles of ethylene oxide per mole of lauramide; and di-isooctylphenol condensed with 15 moles of ethylene oxide.

5. A detergent having the formula $$R^1R^2R^3N \rightarrow O$$

(amine oxide detergent) wherein $R^1$ is an alkyl group containing from about 10 to about 28 carbon atoms, from 0 to about 2 hydroxy groups and from 0 to about 5 ether linkages, there being at least one moiety of $R^1$ which is an alkyl group containing from about 10 to about 18 carbon atoms and 0 ether linkages, and each $R^2$ and $R^3$ are selected from the group consisting of alkyl radicals and hydroxyalkyl radicals containing from 1 to about 3 carbon atoms.

Specific examples of amine oxide detergents include: dimethyldodecylamine oxide, dimethyltetradecylamine oxide, ethylmethyltetradecylamine oxide, cetydimethylamine oxide, dimethylstearylamine oxide, cetylethylpropylamine oxide, diethyldodecylamine oxide, diethyltetradecylamine oxide, dipropyldodecylamine oxide, bis-(2-hydroxyethyl)dodecylamine oxide, bis-(2-hydroxyethyl)-3-dodecoxy-1-hydroxypropylamine oxide, (2-hydroxypropyl)methyltetradecylamine oxide, dimethyloleylamine oxide, dimethyl-(2-hydroxydodecyl)amine oxide, and the corresponding decyl, hexadecyl and octadecyl homologs of the above compounds.

6. A detergent having the formula $$R^1 - \overset{\overset{O}{\uparrow}}{S} - R^2$$

(sulfoxide detergent) wherein $R^1$ is an alkyl radical containing from about 10 to about 28 carbon atoms, from 0 to about 5 ether linkages and from 0 to about 2 hydroxyl substituents, at least one moiety of $R^1$ being an alkyl radical containing 0 ether linkages and containing from about 10 to about 18 carbon atoms, and wherein $R^2$ is an alkyl radical containing from 1 to 3 carbon atoms and from one to two hydroxyl groups: octadecyl methyl sulfoxide, dodecyl methyl sulfoxide, tetradecyl methyl sulfoxide, 3-hydroxytridecyl methyl sulfoxide, 3-methoxytridecyl methyl sulfoxide, 3-hydroxy-4-dodecoxybutyl methyl sulfoxide, octadecyl 2-hydroxyethyl sulfoxide, dodecylethyl sulfoxide.

C. Ampholytic Synthetic Detergents

Ampholytic synthetic detergents can be broadly described as derivatives of aliphatic or aliphatic derivatives of heterocyclic secondary and tertiary amines, in which the aliphatic radical may be straight chain or branched and wherein one of the aliphatic substituents contains from about 8 to 18 carbon atoms and at least one contains an anionic water-solubilizing group, e.g., carboxy, sulfo, or sulfato. Examples of compounds falling within this definition are sodium 3-(dodecylamino)propionate, sodium 3-(dodecylamino)propane-1-sulfonate, sodium 2-(dodecylamino)ethyl sulfate, sodium 2-(dimethylamino)octadecanoate, disodium 3-(N-carboxymethyldodecylamino)propane-1-sulfonate, disodium octadecyl-iminodiacetate, sodium 1-carboxymethyl-2-undecylimidazole, and sodium N,N-bis-(2-hydroxyethyl)-2-sulfato-3-dodecoxypropylamine.

D. Zwitterionic Synthetic Detergents

Zwitterionic synthetic detergents can be broadly described as derivatives of aliphatic quaternary ammonium and phosphonium or tertiary sulfonium compounds, in which the cationic atom may be part of a heterocyclic ring, and in which the aliphatic radical may be straight chain or branched, and wherein one of the aliphatic substituents contains from about 3 to 18 carbon atoms, and at least one aliphatic substituent contains an anionic water-solubilizing groups, e.g., carboxy, sulfo, or sulfato. Examples of compounds falling within this definition are 3-(N,N-dimethyl-N-hexadecyl-ammonio)-2-hydroxypropane-1-sulfonate, 3-(N,N-dimethyl-N-hexadecylammonio)propane-1-sulfonate, 2-(N,N-dimethyl-N-dodecylammonio)acetate, 3-(N,N-dimethyl N-dodecylammonio)propionate, 2-(N,N-dimethyl-N-octadecylammonio)-ethyl sulfate, 2-(S-methyl-S-t-hexadecylsulfonio)ethane-1-sulfonate, 3-(S-methyl-S-dodecylsulfonio)propionate, 4-(S-methyl-S-tetradecylsulfonio)butyrate, 1-(2-hydroxyethyl)-2-undecylimidazolium-1-acetate, 2-(trimethylammonio)octadecanoate, and 3-(N,N-bis-(2-hydroxyethyl)-N-octadecylammonio)-2-hydroxypropane-1-sulfonate. Some of these detergents are described in the following U.S. Pat. Nos. 2,129,264; 2,178,353; 2,774,786; 2,813,898; and 2,828,332.

The soap and non-soap anionic, nonionic and zwitterionic detergent surfactants mentioned above can be used as the sole surface-active agent or the various examples may be mixed when used in the practice of the present invention. The above disclosure includes merely specific illustrations of the numerous surface-active agents which can find application within the scope of this invention.

The preferred calcium-insensitive organic surface-active agents for use in the subject compositions include salts of esters of α-sulfonated fatty acids; salts of 2-acyloxyalkane-1-sulfonic acids; alkyl ether sulfates; β-alkyloxy alkane sulfonates; olefin sulfonates; and certain ampholytic and zwitterionic synthetic detergents.

The preferred salts of esters of an α-sulfonated fatty acid have the following structure:

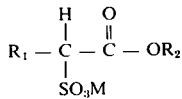

wherein $R_1$ is alkyl or alkenyl of about 10 to about 20 carbon atoms; $R_2$ is alkyl of 1 to about 10 carbon atoms; and M is a salt-forming radical.

The salt-forming radical M in the hereinbefore described structural formula is a water-solubilizing cation and can be, for example, an alkali metal cation (e.g., sodium, potassium, lithium), ammonium or substituted-ammonium cation. Specific examples of substituted ammonium cations include methyl-, dimethyl-, and trimethyl- ammonium cations and quaternary ammonium cations such as tetramethyl-ammonium and dimethyl piperdinium cations and those derived from alkylamines such as ethylamine, diethylamine, triethylamine, mixtures thereof, and the like.

Specific examples of this class of compounds include the sodium and potassium salts of esters where $R_2$ is selected from methyl, ethyl, propyl, butyl, hexyl and octyl groups and the fatty acid group ($R_1$ plus the two carbon atoms in the structure above) is selected from lauric, myristic, palmitic, stearic, palmitoleic, oleic, linoleic acids and mixtures thereof. A preferred ester material herein is the sodium salt of the methyl ester of a α-sulfonated tallow fatty acid, the term tallow indicating a carbon chain distribution approximately as follows: $C_{14}$-2.5%, $C_{16}$-28%, $C_{18}$-23%, palmitoleic-2%, oleic-41.5%, and linoleic-3% (the first three fatty acids listed are saturated).

Other examples of suitable salts of α-sulfonated fatty esters utilizable herein include the ammonium and tetramethylammonium salts of the hexyl, octyl, ethyl, and butyl esters of α-sulfonated tridecanoic acid; the potassium and sodium salts of the ethyl, butyl, hexyl, octyl, and decyl esters of α-sulfonated pentadecanoic acid; and the sodium and potassium salts of butyl, hexyl, octyl, and decyl esters of α-sulfonated heptadecanoic acid; and the lithium and ammonium salts of butyl, hexyl, octyl, and decyl esters of α-sulfonated nonadecanoic acid.

The salts of α-sulfonated fatty acid esters of the present invention are known compounds and are described in U.S. Pat. No. 3,223,645, issued Dec. 14, 1965 to Kalberg, this patent being hereby incorporated by reference.

Another class of preferred anionic organic surface-active agents includes salts of 2-acyloxy-alkane-1-sulfonic acids. These salts have the formula

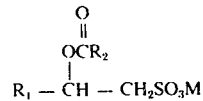

where $R_1$ is alkyl of about 9 to about 23 carbon atoms; $R_2$ is alkyl of 1 to about 8 carbon atoms; and M is a salt-forming radical hereinbefore described.

Specific examples of β-acyloxy-alkane-1-sulfonates, or alternatively 2-acyloxy-alkane-1-sulfonates, utilizable herein to provide excellent cleaning levels under household washing conditions include the sodium salt of 2-acetoxy-tridecane-1-sulfonic acid; the potassium salt of 2-propionyloxy-tetradecane-1-sulfonic acid; the lithium salt of 2-butanoyloxytetradecane-1-sulfonic acid; the sodium salt of 2-pentanoyloxypentadecane-1-sulfonic acid; the ammonium salt of 2-hexanoyloxyhexadecane-1-sulfonic acid; the sodium salt of 2-acetoxy-hexadecane-1-sulfonic acid; the dimethylammonium salt of 2-heptanoyloxytridecane-1-sulfonic acid; the potassium salt of 2-octanoyloxytetradecane-1-sulfonic acid; the dimethylpiperdinium salt of 2-nonanoyloxytetradecane-1-sulfonic acid; the sodium salt of 2-acetoxy-heptadecane-1-sulfonic acid; the lithium salt of 2-acetoxy-octadecane-1-sulfonic acid; the dimethylamine salt of 2-acetoxyoctadecane-1-sulfonic acid; the potassium salt of 2-acetoxy-nonadecane-1-sulfonic acid; the sodium salt of 2-acetoxy-uncosane-1-sulfonic acid; the sodium salt of 2-propionyloxydocosane-1-sulfonic acid; and isomers thereof.

Especially preferred are the alkali metal salts of β-acetoxy-alkane-1-sulfonic acids corresponding to the above formula wherein $R_1$ is an alkyl of about 14 to about 18 carbon atoms, these salts being especially preferred from the standpoints of their excellent cleaning properties and ready availability.

Typical examples of the above described β-acetoxy alkanesulfonates are described in the literature: Belgian Pat. No. 650,323 issued July 9, 1963, discloses the preparation of certain 2-acyloxy alkanesulfonic acids. Similarly, U.S. Pat. Nos. 2,094,451 issued Sept. 28, 1937, to Guenther et al. and 2,086,215 issued July 6, 1937 to DeGroote disclose certain salts of β-acetoxy alkanesulfonic acids. These references are hereby incorporated by reference.

The preferred alkyl ether sulfates have the formula $$RO(C_2H_4O)_xSO_3M$$

wherein R is alkyl or alkenyl of about 10 to about 20 carbon atoms, x is 1 to 30, and M is a salt-forming cation defined hereinbefore.

The alkyl ether sulfates of the present invention are condensation products of ethylene oxide and monohydric alcohols having about 10 to about 20 carbon atoms. Preferably, R has 14 to 18 carbon atoms. The alcohols can be derived from fats, e.g., coconut oil or tallow, or can be synthetic. Lauryl alcohol and straight chain alcohols derived from tallow are preferred herein. Such alcohols are reacted with 1 to 30, and especially 3 to 6, molar proportions of ethylene oxide and the resulting mixture of molecular species, having, for example, an average of 3 to 6 moles of ethylene oxide per mole of alcohol, is sulfated and neutralized.

Specific examples of alkyl ether sulfates of the present invention are sodium coconut alkyl ethylene glycol ether sulfate; lithium tallow alkyl triethylene glycol ether sulfate; sodium tallow alkyl hexaoxyethylene sulfate; and ammonium tetradecyl octaoxyethylene sulfate.

Especially preferred herein for reasons of excellent cleaning properties and ready availability are the alkali metal coconut- and tallow-alkyl oxyethylene ether sulfates having an average of about 1 to about 6 oxyethylene moieties. The alkyl ether sulfates of the present invention are known compounds and are described in U.S. Pat. No. 3,332,876 to Walker (July 25, 1967) incorporated herein by reference.

The preferred β-alkyloxy alkane sulfonates have the following formula:

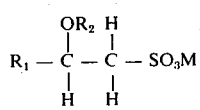

where $R_1$ is an alkyl having from 10 to 20 carbon atoms, $R_2$ is a lower alkyl group having from 1 to 3 carbon atoms, and M is a salt-forming radical hereinbefore described.

Specific examples of β-alkyloxy alkane sulfonates or alternatively 2-alkyloxy-alkane-1-sulfonates, utilizable herein to provide superior cleaning and whitening levels under household washing conditions include potassium β-methoxydecanesulfonate,
sodium β-methoxy-tridecanesulfonate,
potassium β-ethoxytetradecylsulfonate,
sodium β-isopropoxyhexadecylsulfonate,
lithium βt-butoxytetradecylsulfonate,
sodium β-methoxyoctadecylsulfonate, and
ammonium βn-propoxydodecylsulfonate.

Other preferred anionic surface-active agents utilizable herein are olefin sulfonates having about 12 to about 24 carbon atoms. The term "olefin sulfonates" is used herein to mean compounds which can be produced by the sulfonation of α-olefin by means of uncomplexed sulfur trioxide, followed by neutralization of the acid reaction mixture in conditions such that any sultones which have been formed in the reaction are hydrolyzed to give the corresponding hydroxy-alkanesulfonates. The sulfur trioxide may be liquid or gaseous, and is usually, but not necessarily, diluted by inert diluents, for example, by liquid $SO_2$, chlorinated hydrocarbon, etc., when used in the liquid form, or by air, nitrogen, gaseous $SO_2$, etc., when used in the gaseous form.

The α-olefins from which the olefin sulfonates are derived are mono-olefins having 12 to 24 carbon atoms, preferably 14 to 16 carbon atoms. Preferably, they are straight chain olefins. Examples of suitable 1-olefins include 1-dodecene; 1-tetradecene; 1-hexadecene; 1-octadecene; 1-eicosene and 1-tetracosene.

In addition to the true alkene sulfonates and a proportion of hydroxy-alkanesulfonates, the olefin sulfonates can contain minor amounts of other materials, such as alkene disulfonates depending upon the reaction conditions, proportions of reactants, the nature of the starting olefins and impurities in the olefin stock and side reactions during the sulfonation process.

A specific olefin sulfonate anionic detergent which has been found excellent for use in the present invention is described more fully in the U.S. Pat. No. 3,332,880 of Phillip F. Pflaumer and Adriaan Kessler, issued July 25, 1967, titled Detergent Composition; this patent being hereby incorporated by reference.

The preferred ampholytic surface-active agents for use herein can be broadly described as derivatives of aliphatic secondary and tertiary amines in which the aliphatic radical can be straight chain or branched and wherein one of the aliphatic substituents contains from about 8 to about 18 carbon atoms and one contains an anionic water solubilizing group, e.g., carboxy, sulfonate, or sulfate. These detergents have the formula

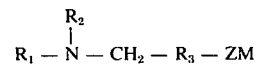

wherein $R_1$ is alkyl of about 8 to about 18 carbon atoms, $R_2$ is alkyl of 1 to about 3 carbon atoms or is hydrogen, $R_3$ is alkylene of 1 to about 4 carbon atoms, Z is carboxy, sulfonate, or sulfate, and M is a salt-forming cation. Examples of compounds falling within this definition are sodium 3-dodecylaminopropionate; sodium 3-dodecylaminopropane sulfonate; N-alkyltaurines such as the ones prepared by reacting dodecylamine with sodium isethionate according to the teaching of U.S. Pat. No. 3,658,072; sodium salts of N-higher alkyl aspartic acids such as those produced according to the teaching of U.S. Pat. No. 2,438,091; and the products sold under the trade name "Miranol" and described in U.S. Pat. No. 2,528,378.

The preferred zwitterionic surface-active agents can be broadly described as derivatives of aliphatic quaternary ammonium, and sulfonium compounds, in which the aliphatic radicals can be straight chain or branched, and wherein one of the aliphatic substituents contains from about 8 to 18 carbon atoms and one contains an anionic water solubilizing group, e.g., carboxy, sulfonate or sulfate. A general formula for these compounds is:

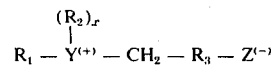

wherein $R_1$ contains an alkyl, alkenyl, or hydroxyalkyl radical of from about 8 to about 18 carbon atoms having from 0 to about 10 ethylene oxide moieties and from 0 to 1 glyceryl moietyl; Y is selected from the group consisting of hydrogen and sulfur atoms; $R_2$ is an alkyl or monohydroxy alkyl group containing 1 to about 3 carbon atoms; $x$ is 1 when Y is a sulfur atom and 2 when Y is a nitrogen atom, $R_3$ is an alkylene or hydroxy alkylene of from 1 to about 4 carbon atoms and Z is a radical selected from the group consisting of carboxylate, sulfonate, sulfate, phosphonate and phosphate groups.

Examples include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropylammonio]-propane-1-phosphonate; 3-(N,N-dimethyl-N-hexadecylammonio)propane-1-sulfonate, 3-(N,N-dimethyl-N-hexadecylammonio)-2-hydroxypropane-1-sulfonate, 4-[N,N-di(2-hydroxyethyl)-N-(2-hydroxydodecyl)ammonio]butane-1-carboxylate, 3-[S-ethyl-S-(3-dodecoxy-2-hydroxypropyl)sulfonio]-propane-1-phosphate, 3-[P,P-dimethyl-P-dodecylphosphonio]propane-1-phosphonate, and 3-[N,N-di(3-hydroxypropyl)-N-hexadecyl ammonio]-2-hydroxypentane-1-sulfonate. Examples of compounds falling within this definition are 3-(N,N-dimethyl-N-hexadecylammonio)propane-1-sulfonate and 3-(N,N-dimethyl-N-tridecylammonio)-2-hydroxypropane-1-sulfonate which are especially preferred for their excellent cool water detergency characteristics.

The preferred organic surface-active agent described hereinbefore shall preferably be used in an amount of from about 8 to about 50% of the detergent compositions of the instant invention.

The foregoing detergent compounds can be made into any of the several commercially desirable composition forms, for example, granular, flake, liquid and tablet forms.

The specific action of the built detergent compositions of this invention will vary to some extent depending upon the ratio of active detergent to builder mixture in any given detergent composition. There will be further variation in the strengths of the washing solutions employed by different housewives. Moreover, there will be variations in temperature and in soil loads as between washing operations. Further, the degree of hardness of the water used to make up the washing solutions will also bring about apparent differences in the cleaning power and whiteness maintenance results. Finally, different fabrics will respond in somewhat different ways to different detergent compositions. The best type of detergent composition for household use would in theory be a composition which accomplishes an excellent cleaning and whiteness maintenance effect under the most diverse cleaning conditions. The built detergent compositions of this invention are especially valuable in this respect.

It may be stated that useful degrees of building activity may be attained in the practice of this invention with ratios of detergent active ingredient to builder mixture of from about 20:1 to about 1:20. A preferred range being from 10:1 to about 1:10.

It will be understood by the skilled worker in the art that detergent compositions, including the compositions of this invention, will ordinarily contain various ingredients for special purposes. Thus, they can contain suds builders, suds depressants, anti-corrosion agents, antiredeposition agents, germicidal agents, antibacterial agents, dyes, fluorescers, perfumes, enzymes, bleaching agents and the like, without interfering with the basic characteristic of this invention. In the manufacture of liquid detergents, water or alcohol vehicles or mixtures of the two, together with solubilizing agents and the like, as known in the art, can be used. These form no limitation on the invention, but are intended to be includable within the terms of claims calling for compositions consisting essentially of active ingredients and builder mixtures in accordance with the teachings herein.

The detergent compositions of this invention are preferably used to provide a pH in aqueous washing solution within a pH range of about 7 to about 12; the optimum building effects are obtained within this range. Washing temperatures usually range from about 80° to about 200°F. Fabrics are preferably rinsed and dried after washing.

The invention is further demonstrated by the following examples.

EXAMPLE II

A solid, heavy-duty detergent composition was made up according to the following formulation:

| | |
|---|---|
| 25% | Sodium salt of sulfuric acid esters of the reaction product of one mole of tallow alcohol with 3 moles of ethylene oxide. |
| 5% | Hexasodium salt of mellitic acid |
| 25% | Sodium carbonate |
| 25% | Sodium silicate ($SiO_2/Na_2O$ ratio 2.0) |
| 10% | Sodium sulfate |
| Balance | Moisture |

No fluorescers or antiredeposition agents were used. Sodium salt of sulfuric acid esters of the reaction product of one mole of tallow alcohol with 3 moles of ethylene oxide was chosen as a synthetic surface-active agent of high detergency. The builder mixture provided excellent sequestering and whiteness maintenance properties when compared with the standard builder, sodium tripolyphosphate used alone in an otherwise similar detergent composition.

Substantially identical results can be obtained in the event the hexasodium salt of mellitic acid is substituted with an equivalent quantity of cyclopentane-cis,cis,cis-tetracarboxylic acid, polyacrylic acid (average molecular wt. of Ca 3500), addition product of polyvinylethylether (MW 4000) & 20% maleic acid, addition product of polyethyleneglycol (MW 1000) diacetate & 10% maleic acid, addition product of polyethyleneglycol (MW 600) diacetate & 40% maleic acid, addition product of pentaerythritol ethylene oxide (MW 4000) tetraacetate & 40% maleic acid, addition product of polyethylene oxide (20 molecules) sperm oil alcohol acetate & 32.5% maleic acid, ethylenetetracarboxylic acid, polyallylsuccinate, hexapotassium cyclopentadienide pentacarboxylate, isobutylenemaleic acid copolymer, 2,3,4,5-tetrahydrofuran-cis,cis,cis-tetracarboxylic acid, carboxymethyl starch degree of substitution 0.8, carboxymethyl starch degree of substitution 1.7, polycarboxymethylated dicarboxyl starch degree of substitution approx. 2.8, sodium salt of carboxymethyl cellulose degree of substitution 2.0, carboxymethyl dextran degree of substitution 2.0, propylene/maleic acid copolymer, diacid cellulose, carboxymethylated sodium alginate, vinylmethylether/maleic acid copolymer low molecular weight, vinylmethylether/maleic acid copolymer medium molecular weight, vinylmethylether/maleic acid copolymer high molecular weight, sodium perborate, sodium polymaleic acid (MW 2500), sodium alginate, 70:30 acrylic acid/hydroxyethylmaleate copolymer, polymethylacrylic acid, 1:1 styrene/maleic acid copolymer, polyvinyl sulfate, and xylaric acid.

Substantially identical results can also be obtained in the event the sodium salt of the tallow triethoxy sulfate is replaced by sodium α-sulfo fatty acid esters whereby the fatty acid is selected from lauric acid, myristic acid, palmitic acid, stearic acid, pentadecanoic acid, heptadecanoic acid, and nonadecanoic acid; and whereby the esterification is carried out with an alcohol selected from ethyl-, butyl-, hexyl-, octyl-, or decyl-alcohol; sodium 2-acetoxytridecane-1-sulfonate; potassium 2-propionyloxy-tetradecane-1-sulfonate; lithium 2-butanoyloxytetradecane-1-sulfonate; sodium 2-acetoxy-hexanoyloxy-hexadecane-1-sulfonate; dimethylammonium salt of 2-heptanoyloxy-tridecane-1-sulfonate; potassium 2-octanoyloxy-tetradecenesulfonate; sodium coconut alkyl ethylene glycol ether sulfate; lithium tallow alkyl triethylene glycol ether sulfate; sodium tallow alkyl hexaoxyethylene sulfate; ammonium tetradecyl octaoxyethylene sulfate; potassium β-methoxydecane sulfonate; sodium β-methoxy-tridecanesulfonate; potassium β-ethoxytetradecylsulfonate; sodium β-isopropoxyhexadecylsulfonate; lithium βt-butoxytetradecylsulfonate; sodium β-methoxyoctadecylsulfonate; ammonium βn-propoxydodecylsulfonate; 3-, 4-, and 5-hydroxy alkane sulfonates and mixtures thereof, whereby in said mixtures the 4-isomer, at least, represents 50% by reference to either the 3-, or the 5-isomer, or a mixture of both; sodium 3-dodecyl aminopropane sulfonate; sodium 3-dodecylaminopropionate; 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropylammonio]-propane-1-phosphonate; 3-(N,N-dimethyl-N-hexadecylammonio)propane-1-sulfonate, 3-(N,N-dimethyl-N-hexadecylammonio)-2-hydroxypropane-1-sulfonate, 4-[N,N-di(2-hydroxyethyl)-N-(2-hydroxydodecyl)ammonio]butane-1-carboxylate, 3-[S-ethyl-S-(3-dodecoxy-2-hydroxypropyl)sulfonio]-propane-1-phosphate, 3-[P,P-dimethyl-P-dodecylphosphonio]propane-1-phosphonate, and 3-[N,N-di(3-hydroxypropyl)-N-hexadecyl ammonio]-2-hydroxypentane-1-sulfonate; 3-(N,N-dimethyl-N-hexadecylammonio)propane-1-sulfonate and 3-(N,N-dimethyl-N-tridecylammonio)-2-hydroxypropane-1-sulfonate.

What is claimed is:

1. A built detergent composition consisting essentially of:
   a. from 8 to 50% by weight of an organic surface-active agent selected from the group consisting of anionic; nonionic; zwitterionic; and ampholytic detergents; and mixtures thereof;
   b. from 70 to 25% by weight of an inorganic precipitating builder selected from the group consisting of a water-soluble carbonate, silicate and aluminate salt and mixtures thereof; and
   c. from 0.1 to 10% by weight of a precipitation modifier selected from the group consisting of:
   mellitic acid, xylaric acid, cyclopentane-cis, cis, cis-tetracarboxylate acid, addition product of polyvinylethylether (MW 4000) & 20% maleic acid, addition product of polyethyleneglycol (MW 1000) diacetate & 10% maleic acid, addition product of polyethyleneglycol (MW 600) diacetate &
   40% maleic acid, addition product of pentaerythritol ethylene oxide (MW 4000) tetraacetate & 40% maleic acid, addition product of polyethylene oxide (20 molecules) sperm oil alcohol acetate & 32.5% maleic acid, ethylenetetracarboxylic acid, polyallylsuccinate, hexapotassium cyclopentadienide pentacarboxylate, 2,3,4,5-tetrahydrofuran-cis, cis, cis-tetracarboxylic acid, carboxymethyl starch degree of substitution 0.8, carboxymethyl starch degree of substitution 1.7, polycarboxymethylated dicarboxyl starch degree of substitution approx. 2.8, sodium salt of carboxymethyl cellulose degree of substitution 2.0, carboxymethyl dextran degree of substitution 2.0, propylene/maleic acid copolymer, diacid cellulose, carboxymethylated sodium alginate, sodium polymaleate (mol. weight 2500), sodium alginate, 70:30 acrylic acid/hydroxyethylmaleate copolymer, polyvinyl sulfate, hexasodium 1,1,3,3,5,5-pentane hexacarboxylate and mixtures thereof whereby the weight ratio of said builder to said modifier is in the range from 1000:1 to 1:1 and the weight ratio of said organic surface-active agent to said builder is in the range from 20:1 to 1:20.

2. A detergent composition in accordance with claim 1 wherein the weight ratio of the component (b) to component (c) is in the range from 500:1 to 2:1.

3. A detergent composition in accordance with claim 2 wherein the organic surface-active agent is mineral insensitive and is selected from the group consisting of
   1. compounds of the formula

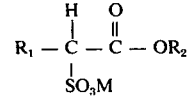

wherein $R_1$ is alkyl or alkenyl of about 10 to about 20 carbon atoms, $R_2$ is alkyl of 1 to about 10 carbon atoms and M is a salt-forming radical;
   2. compounds of the formula

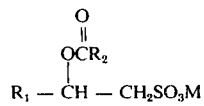

wherein $R_1$ is alkyl of about 9 to about 23 carbon atoms; $R_2$ is alkyl of 1 to about 8 carbon atoms; and M is a salt forming radical
   3. alkyl ether sulfates of the formula;

$$RO(C_2H_4O)_xSO_3M$$

wherein R is alkyl or alkenyl of about 10 to about 20 carbon atoms, $x$ is 1 to 30, and M is a salt-forming radical 4. compounds of the formula

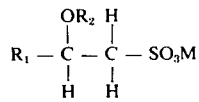

wherein $R_1$ is an alkyl of about 10 to 20 carbon atoms, $R_2$ is an alkyl of 1 to about 3 carbon atoms, and M is a salt-forming radical;

5. olefin sulfonates having about 12 to about 24 carbon atoms;

6. compounds of the formula

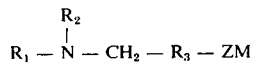

wherein $R_1$ is alkyl of about 8 to about 18 carbon atoms, $R_2$ is alkyl of 1 to about 3 carbon atoms or is hydrogen, $R_3$ is alkylene of 1 to about 4 carbon atoms, Z is carboxy, sulfonate or sulfate, and M is a salt-forming radical; and 7. compounds of the formula

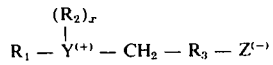

4. A detergent composition in accordance with claim 3 wherein the precipitation modifier is selected from the group consisting of cyclopentane-cis, cis, cis-tetracarboxylic acid, an addition product of polyethyleneglycol (MW 1000) diacetate and 10% maleic acid, an addition product of polyethyleneglycol (MW 600) diacetate and 40% maleic acid, an addition product of pentaerythritol ethylene oxide (MW 4000) tetraacetate and 40% maleic acid, an addition product of polyethylene oxide (20 molecules) sperm oil alcohol acetate and 32.5% maleic acid, ethylenetetracarboxylic acid, polyallylsuccinate, hexapotassium cyclopentadienide pentacarboxylate, 2,3,4,5-tetra-hydrofutan-cis, cis, cis-tetra-carboxylic acid, polyvinylsulfate, hexasodium 1,1,3,3,5,5-pentane hexacarboxylate, and xylaric acid, and mixtures thereof.

5. A detergent composition in accordance with claim 4 wherein the alkyl ether sulfates are selected from the group consisting of sodium coconut alkyl ethylene glycol ether sulfate, lithium tallow alkyl triethylene glycol ether sulfate, sodium tallow alkyl hexaoxyethylene sulfate; and ammonium tetradecyl octaoxyethylene sulfate, and mixtures thereof.

6. A detergent composition in accordance with claim 4 characterized in that the a-olefins are derived from mono olefins selected from the group consisting of 1-dodecene, 1-tetradecene, 1-hexadecene, 1-octadecene, 1-eicosene, 1-tetracocene and mixtures thereof, whereby the sulfonation reaction is carried out be means of uncomplexed sulfur trioxide.

7. A detergent composition in accordance with claim 4 wherein the precipitation modifier is selected from the group consisting of xylaric acid and polyvinyl sulfate and mixtures thereof.

8. A detergent composition in accordance with claim 4 wherein the precipitation modifier is selected from the group consisting of carboxymethyl starch degree of substitution 0.8, carboxymethyl starch degree of substitution 1.7, polycarboxymethylated dicarboxyl starch degree of substitution approximately 2.8, sodium salt of carboxymethyl cellulose degree of substitution 2.0, carboxymethyl dextran degree of substitution 2.0, diacid cellulose, carboxymethylated sodium alginate, and mixtures thereof.

* * * * *

UNITED STATES PATENT OFFICE
CERTIFICATE OF CORRECTION

PATENT NO. : 3,896,056
DATED : July 22, 1975
INVENTOR(S) : LAWRENCE BENJAMIN and DANIEL S. CONNOR It is certified that error appears in the above-identified patent and that said Letters Patent are hereby corrected as shown below:

Column 1, line 49, "slats" should be -- salts --.
Column 8, line 5, "80°" should be -- 80°F --.
Column 15, line 2, "moietyl" should be -- moiety --.
Column 19, line 34, after the formula please add
-- wherein $R_1$ is alkyl, alkenyl or hydroxyalkyl of about 8 to about 18 carbon atoms, having from 0 to about 10 ethylene oxide moieties and 0 to 1 glyceryl moiety, Y is selected from the group consisting of hydrogen and sulfur atoms, $R_2$ is alkyl or monohydroxyalkyl of 1 to about 3 carbon atoms, x is 1 when Y is sulfur, $R_3$ is alkylene or hydroxyalkylene of 1 to about 4 carbon atoms and Z is carboxylate, sulfonate, sulfate, phosphonate or phosphate. --
Column 20, line 7, "2,3,4,5-tetra-hydrofutan" should read -- 2,3,4,5-tetra-hydrofuran --.
Column 20, line 24, "be" should be -- by --.

Signed and Sealed this twentieth Day of April 1976

[SEAL]

Attest:

RUTH C. MASON
Attesting Officer

C. MARSHALL DANN
Commissioner of Patents and Trademarks